United States Patent
Liu et al.

(10) Patent No.: US 12,406,115 B2
(45) Date of Patent: Sep. 2, 2025

(54) NUMERICAL SIMULATION METHOD OF INFLUENCE OF PTFE-BASED MEMBRANE ON AERODYNAMIC CHARACTERISTIC OF WIND TURBINE BLADE

(71) Applicants: CHINA THREE GORGES CORPORATION, Beijing (CN); CHINA THREE GORGES RENEWABLES (GROUP) CO., LTD., Beijing (CN); NANJING HAOHUI HI TECH CO., LTD., Jiangsu (CN)

(72) Inventors: Jianping Liu, Beijing (CN); Xin Xiang, Beijing (CN); Jianhua Wu, Jiangsu (CN); Zhiyu Sun, Beijing (CN); Yawei Zhu, Jiangsu (CN); Wenwei Li, Beijing (CN); Yajing Li, Beijing (CN); Hong Wu, Jiangsu (CN); Jingxin Zhao, Jiangsu (CN); Jianping Wu, Jiangsu (CN); Hongwei Min, Jiangsu (CN)

(73) Assignees: CHINA THREE GORGES CORPORATION (CN); CHINA THREE GORGES RENEWABLES (GROUP) CO., LTD. (CN); NANJING HAOHUI HI TECH CO., LTD. (CN)

( * ) Notice: Subject to any disclaimer, the term of this patent is extended or adjusted under 35 U.S.C. 154(b) by 314 days.

(21) Appl. No.: 17/640,738

(22) PCT Filed: Dec. 15, 2020

(86) PCT No.: PCT/CN2020/136606
§ 371 (c)(1),
(2) Date: Mar. 4, 2022

(87) PCT Pub. No.: WO2022/011961
PCT Pub. Date: Jan. 20, 2022

(65) Prior Publication Data
US 2023/0259678 A1     Aug. 17, 2023

(30) Foreign Application Priority Data

Nov. 5, 2020    (CN) .......................... 202011226779.0

(51) Int. Cl.
     *G06F 30/28*      (2020.01)
     *G06F 30/17*      (2020.01)
     (Continued)

(52) U.S. Cl.
     CPC .............. *G06F 30/28* (2020.01); *G06F 30/17* (2020.01); *G06F 2111/10* (2020.01); *G06F 2113/06* (2020.01)

(58) Field of Classification Search
CPC .. G06F 30/17; G06F 2113/06; G06F 2111/10; F03D 1/0675; F03D 1/0633; F05B 2230/90; F05B 2250/60
See application file for complete search history.

(56) References Cited

U.S. PATENT DOCUMENTS

| | | | |
|---|---|---|---|
| 6,729,846 B1 * | 5/2004 | Wobben | F03D 80/00 416/241 A |
| 2007/0107220 A1 * | 5/2007 | Bakhuis | F03D 1/0675 29/889.7 |

(Continued)

FOREIGN PATENT DOCUMENTS

| | | |
|---|---|---|
| CN | 101532906 A | 9/2009 |
| CN | 102680226 A | 9/2012 |

(Continued)

OTHER PUBLICATIONS

International Search Report of PCT/CN2020/136606.
Written Opinion of PCT/CN2020/136606.

*Primary Examiner* — Courtney D Heinle
*Assistant Examiner* — Andrew Thanh Bui

(57) ABSTRACT

The disclosure discloses a numerical simulation method of an influence of a polytetrafluoroethylene (PTFE)-based membrane on an aerodynamic characteristic of a wind turbine blade, and relates to the technical field of polymer composites. The simulation method comprises the following (Continued)

steps: selecting a wind turbine generator, a blade airfoil and a PTFE-based nano functional membrane; setting a numerical simulation computation network and a computation area of a wind energy capture area; determining main computation parameters and a Reynolds number for aerodynamic characteristic computation; establishing a geometrical model whose airfoil boundary extends by 0.26 mm (membrane thickness) along a normal direction to obtain a new computational geometry; computing by using a hydrodynamic computation method and a finite volume method; and obtaining an influence number simulation computation result.

2 Claims, 8 Drawing Sheets

(51) Int. Cl.
  *G06F 111/10* (2020.01)
  *G06F 113/06* (2020.01)

(56) References Cited

U.S. PATENT DOCUMENTS

| | | | |
|---|---|---|---|
| 2014/0119940 A1* | 5/2014 | Krishnamurthy | F03D 1/0675 29/889.7 |
| 2018/0335015 A1* | 11/2018 | Zhang | H01Q 17/00 |

FOREIGN PATENT DOCUMENTS

| | | |
|---|---|---|
| CN | 104612892 A | 5/2015 |
| CN | 110110427 A | 8/2019 |
| CN | 111173675 A | 5/2020 |
| WO | 2010031545 A2 | 3/2010 |

* cited by examiner

DU91-W2-250

1a

NACA64418

1b

3a

3b

NUMERICAL SIMULATION METHOD OF INFLUENCE OF PTFE-BASED MEMBRANE ON AERODYNAMIC CHARACTERISTIC OF WIND TURBINE BLADE

CROSS-REFERENCE TO RELATED APPLICATIONS

This Application is a national stage application of PCT/CN2020/136606. This application claims priorities from PCT Application No. PCT/CN2020/136606, filed Dec. 15, 2020, and from the Chinese patent application 202011226779.0 filed Nov. 5, 2020, the content of which are incorporated herein in the entirety by reference.

FIELD OF TECHNOLOGY

The disclosure relates to the technical field of polymer composites, and particularly relates to a numerical simulation method of an influence of a polytetrafluoroethylene (PTFE)-based membrane on an aerodynamic characteristic of a wind turbine blade.

BACKGROUND

Wind power is a clean energy with a huge resource potential and an essentially mature technology that plays an important role in optimizing the energy structure, reducing the emission of greenhouse gases, and dealing with climate changes. By the end of 2018, the installed capacity of wind power in China had reached 210 million kwh, which proved that the promotion of wind power had become one of China's core strategies to boost energy transition, deal with climate changes, promote ecologically sustainable development, advance the revolution of energy production and consumption, and control atmospheric pollution. With the execution of "Energy Development Strategic Action Plan (2014-2020)" published by the General Office of the State Council on the goal for grid-connected wind power to achieve coal-level prices in 2020, all the feed-in tariffs of wind power in China have passed a competition, which promotes healthy competition and greatly stimulates the large-scale sustainable development of wind power industry. Furthermore, the fierce competition caused by the restriction on feed-in tariffs forces wind power enterprises to pay more attention to factors including the resource status of wind power projects, the technology of equipment, and the cost of power generation. Only by technological innovation can we achieve the efficient utilization of wind energy resources.

A wind turbine blade is a key component of a wind turbine generator. It plays a key role in wind energy capture, wind power safety, and economic benefits. In the field of wind power, there are many studies and experiments on the aerodynamic performance of blade airfoils: R.P.J.O.M. van Rooij et al. from Danish National Laboratory proposed, for three types of blade airfoils with different thickness, a method of using an inside effect to analyze the influence of surface dust at the 10% length of the blade chord on the sensitive position of the airfoil; Danish National Laboratory and W. A. Timmer et al. concluded that the lift coefficient of the blade airfoil increases as the Reynolds number increases; Nengsheng Bao et al. from Tsinghua University deeply studied the formation principle and general theory of the surface roughness of the airfoil by locally increasing the roughness on the surface of the blade airfoil and analyzing the influence of distribution and roughness on the aerodynamic performance of the blade via the wind tunnel laboratory, and they concluded that the change in coefficient is the most significant when the length of the roughness band is 10% of the chord length; Rennian Li from Lanzhou University of Technology studied the aerodynamic performance of the two-dimensional roughness surface of DU-95-W2-180 blade airfoil using a numerical method and came to the conclusion that increasing the roughness near the trailing boundary of the blade airfoil can improve the lift coefficient of DU-95-W2-180 blade airfoil; Nagaishi Akira et al. from Tokai University, Japan conducted aerodynamic performance wind tunnel experiments about horizontal axis wind turbine blades and concluded that the asymmetric flow at the turning point of the boundary of a circular airfoil causes a gradient change in partial lift coefficient and drag coefficient, which they named "roughness", and that, with increased roughness and thickness, the maximum change in lift coefficient occurs at a low angle of attack and the Reynolds number becomes larger.

By analyzing literature around the world, it can be seen that the current research on the aerodynamic performance of blades of large wind turbine generators is relatively mature, but all research is targeted at and based on the original conventional coating surface roughness on the surface of the blade, and the corresponding conclusions are concepts and experimental results related to the characteristic roughness of the blade airfoil under the conventional coating, and the conclusions about the influence of the roughness on the aerodynamic performance of the blade airfoil are not consistent. Almost vacant are numerical computation and analysis of the influence of covering the surface of wind turbine blades with pasted PTFE-based nano functional composite membranes on the aerodynamic characteristic and overall aerodynamic performance of the blade airfoil.

The existing technology and materials of the surface coating of wind turbine blades are far from meeting the urgent need to improve the characteristics and overall aerodynamic performance of the blade airfoil, the wind energy utilization coefficient, and the quality and efficiency of wind power. With the rapid development of science and technology, breakthroughs in material science will inevitably lead to the emergence of various advanced functional new materials. The restriction on wind power feed-in tariffs will also force the wind power industry to invent new materials and technology to achieve an efficient use of wind energy resources. To support the application of new materials and technology in wind power generation, we need a numerical method to simulate the aerodynamic characteristics and overall aerodynamic performance of wind turbine blade airfoils that use new materials and technology.

SUMMARY

In order to solve the above technical problems, the disclosure provides a numerical simulation method of an influence of an aerodynamic characteristic of a PTFE-based membrane on a wind turbine blade, wherein simulation computation is performed on influence numbers of a PTFE-based nano functional composite membrane on aerodynamic characteristics and entire aerodynamic performance of a blade airfoil after pasting and covering the surfaces of blades of a large horizontal axis wind turbine by using a hydrodynamic computation method, which comprises the following steps:
(1) selecting two blade airfoils;
(2) determining that wind energy capture areas of a blade are located in middle and tip areas of the blade, selecting chord length positions and angle of attack ranges of the two airfoils according to respective spreading position and chord length distribution direction, and meanwhile selecting Reynolds numbers for aerodynamic characteristic computation of the airfoils;

(3) selecting the PTFE-based nano functional composite membrane with a maximum thickness of 0.26 mm and a surface roughness of 0.18 μm;

(4) solving a two-dimension incompressible Navier-Stokes equation by using a finite volume method, wherein the computation state is a steady state, turbulence simulation adopts an SST k-ω model, the computation grid of the airfoil adopts a C-shaped structure grid, and the height of the first-layer grid of the surface of the blade satisfies $y^+ \approx 1$;

(5) geometrically modeling, and spreading the boundary of the airfoil along a normal direction by the same distance as a membrane thickness to obtain a new computational geometry;

(6) performing influence number simulation computation, wherein the action point of a moment is selected at the position of ¼ chord length of the airfoil, so that the rise moment of the airfoil is positive, and the bow moment of the airfoil is negative, an airfoil lift coefficient is $$C_L = \frac{L}{\frac{1}{2}\rho V_\infty^2 c};$$

a drag coefficient is $$C_D = \frac{D}{\frac{1}{2}\rho V_\infty^2 c};$$

a pitching moment coefficient is $$C_M = \frac{M}{\frac{1}{2}\rho V_\infty^2 c^2};$$

and (7) comparatively analyzing changes in aerodynamic coefficients of two wind turbine generator blade airfoils before and after being pasted and covered with the PTFE-based nano functional composite membrane to obtain influence number simulation computation results.

The technical effects are as follows: simulation computation is performed on influence numbers of the PTFE-based nano functional composite membrane on the aerodynamic characteristics of a blade airfoil and the entire aerodynamic performance of the blade on the basis of aerodynamics and structural dynamics after the large wind turbine generator is pasted and covered with the PTFE-based nano functional composite membrane, thereby providing a scientific basis for application of new materials and new technologies in wind power generation.

The technical solution further defined by the disclosure is as follows:

The numerical simulation method of the influence of the PTFE-based membrane on the aerodynamic characteristic of the wind turbine blade further comprises the following steps:

(1) selecting four wind turbine generators with different capacities, including China Southern Airlines 1.5MW-NH1500 wind turbine generator and 2.5MW turbine generator, American renewable energy laboratory 5MW offshore wind turbine generator and 2MW turbine generator, and finally selecting two basic blade airfoils commonly used in aviation by referring to design data of four wind turbine generator blades, namely, Netherland Delft University DU91-W2-250 and NACA64-418;

(2) determining that the wind energy capture areas of the blade are located on the middle and tip areas of the blade, selecting chord length positions and angle of attack ranges of the two airfoils according to respective spreading position and chord length distribution direction, wherein the chord length positions are selected by referring to 60% R position and 85% R position of blades of a UP2000-96 wind turbine, R represents the chord length of each sectional airfoil of the blade in a radial direction, respectively being 1.65 m and 1.15 m; the angle of attack ranges are both [−4, 14], and meanwhile the Reynolds number for aerodynamic characteristic computation is selected as 3.0×106;

(3) selecting the PTFE-based nano functional composite membrane with a maximum thickness of 0.26 mm and a surface roughness of 0.18 μm;

(4) solving a two-dimension incompressible Navier-Stokes equation by using a finite volume method, wherein the computation state is a steady state, turbulence simulation adopts an SST k-ω model, the computation grid of the airfoil adopts a C-shaped structure grid, 400 grid points are present around the airfoil, the height of the first-layer grid of the blade surface is 9.0×10−6 m and satisfies $y+\approx 1$ (the first layer is a bottom layer, and y+ represents a thickness, and 1 represents a precision), and the total number of the grids is 300 thousand;

(5) geometrically modeling, and spreading the boundary of the airfoil along a normal direction by 0.26 mm to obtain a new computational geometry;

(6) performing influence number simulation computation, wherein the action point of a moment is selected at the position of ¼ chord length of the airfoil, so that the rise moment of the airfoil is positive, and the bow moment of the airfoil is negative, an airfoil lift coefficient is $$C_L = \frac{L}{\frac{1}{2}\rho V_\infty^2 c};$$

a drag coefficient is $$C_D = \frac{D}{\frac{1}{2}\rho V_\infty^2 c};$$

a pitching moment coefficient is $$C_M = \frac{M}{\frac{1}{2}\rho V_\infty^2 c^2};$$

and
(7) comparatively analyzing changes in aerodynamic coefficients of two wind turbine generator blade airfoils before and after being pasted and covered with the PTFE-based nano functional composite membrane to obtain influence number simulation computation results:

in the linear change area, the lift, drag and moment coefficients of the airfoil are basically not affected by the PTFE-based nano functional composite membrane; in the non-linear change area, each aerodynamic parameter is slightly affected by the PTFE-based nano functional composite membrane so as to lead to reduction in lift coefficient and moment coefficient, and the change percentage of each aerodynamic coefficient is 1.9% or less with little influence;

from the point of view of surface roughness, the PTFE-based nano functional composite membrane can play a role in improving the aerodynamic characteristics of the airfoil and the entire aerodynamic performance of the blade after pasting and covering the wind turbine blade.

The disclosure has the beneficial effects:

(1) starting from the basic two-dimensional airfoil, numerical computation and comparative analysis are performed on the lift coefficients, the drag coefficients and the moment coefficients of common blade airfoils of two large horizontal axis wind turbine generators before and after being pasted and covered with the PTFE-based nano functional composite membrane under typical Reynolds numbers, and then a computation conclusion of influence numbers of the PTFE-based nano functional composite membrane, after pasting and covering the surface of the blade of the large horizontal axis wind turbine, on aerodynamic characteristics and entire aerodynamic performance of the blade airfoil is gained; and (2) by the disclosure, numerical simulation computation is performed on aerodynamic characteristics and entire aerodynamic performances of blade airfoils of all large horizontal axis wind turbine generators.

DETAILED DESCRIPTION OF THE EMBODIMENTS

Figure 1:
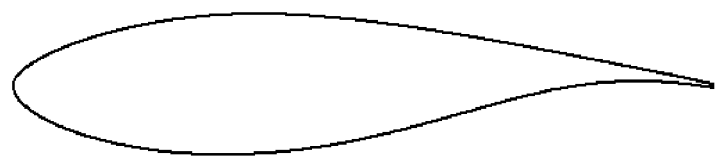
FIG. 1 is a diagram of a DU91-W2-250 airfoil and an NACA64-418 airfoil.
Figure 1:
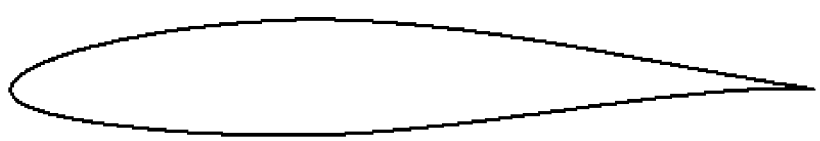

A numerical simulation method of an influence of a PTFE-based membrane on an aerodynamic characteristic of a wind turbine blade provided in this example comprises the following steps:

four wind turbine generators with different capacities were selected, including China Southern Airlines 1.5MW-NH1500 wind turbine generator and 2.5MW turbine generator, and American renewable energy laboratory 5MW offshore wind turbine generator and 2MW turbine generator. By referring to design data of blades of four wind turbine generators, two basic blade airfoils were finally selected, namely, the Netherland Delft University DU91-W2-250 and NACA64-418 commonly used in aviation, as shown in FIG. 1;

it was determined that the wind energy capture areas of the blade were located in middle and tip areas of the blade, chord length positions and angle of attack ranges of the two airfoils were selected according to respective spreading position and chord length distribution direction, wherein the chord length positions were selected by referring to 60% R position and 85% R position of a UP2000-96 wind turbine blade, R represented the chord length of each sectional airfoil of the blade in a radial direction, respectively being 1.65 m and 1.15 m; the angle of attack ranges were both [−4, 14], and the relevant parameters of the airfoil are seen in Table 1. Meanwhile, the Reynolds number for aerodynamic characteristic computation was selected as $3.0 \times 10^6$ since the operating state of a megawatt-grade wind turbine was considered;

TABLE 1

Airfoils and main computation parameters

Figure 2:
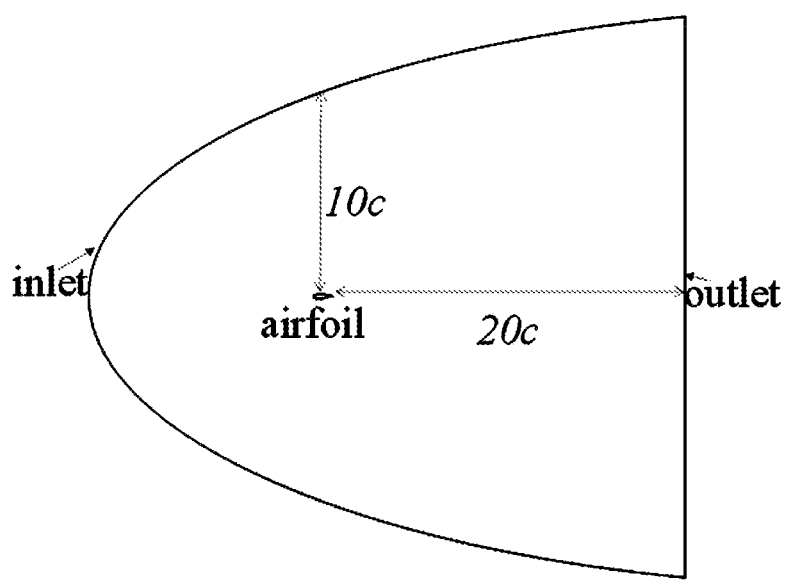
FIG. 2 is a diagram of a computation domain of numerical simulation.
Figure 3:
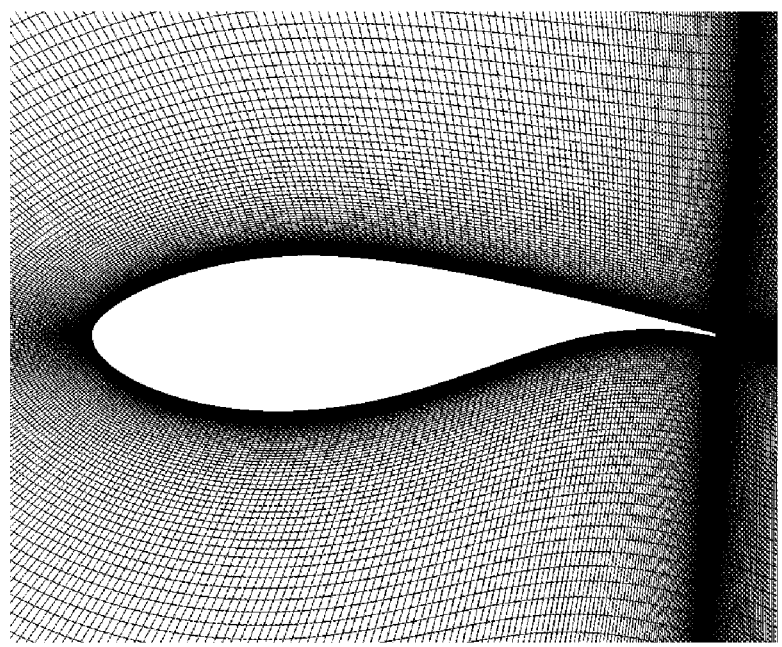
FIG. 3 is a detailed graph of nearby grids of a DU91-W2-250 airfoil and an NACA64-418 airfoil.
Figure 3:
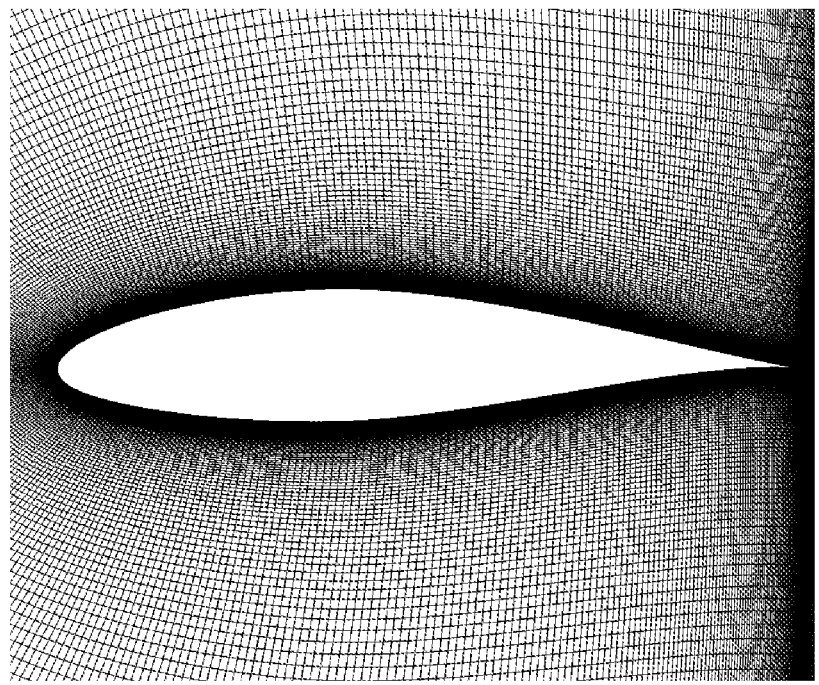
Figure 4:
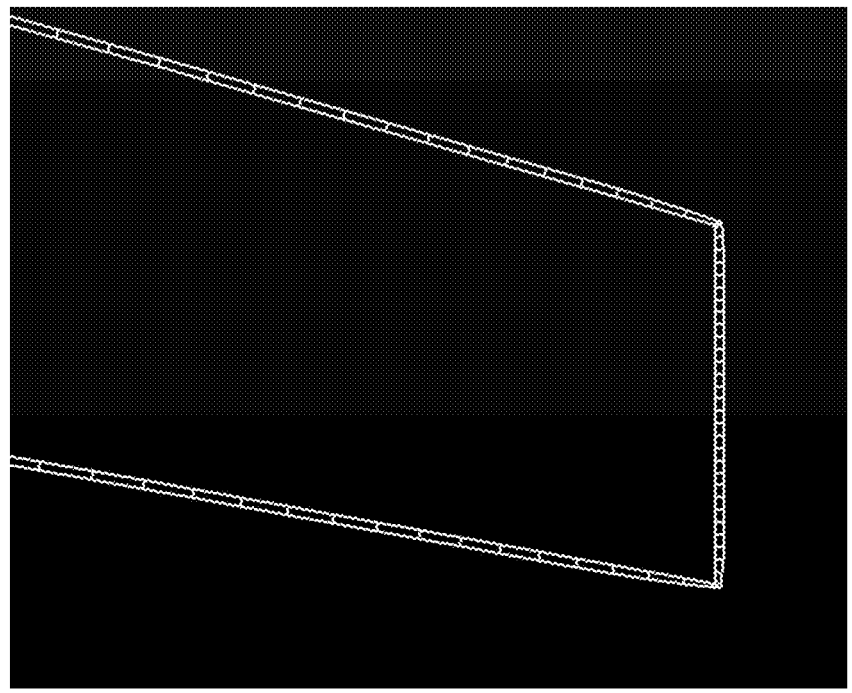
FIG. 4 is an effect graph of a DU91-W2-250 airfoil after being pasted and covered with a membrane (airfoil trailing boundary details, and a slash represents a membrane with a thickness of 0.26 mm).
Figure 5:
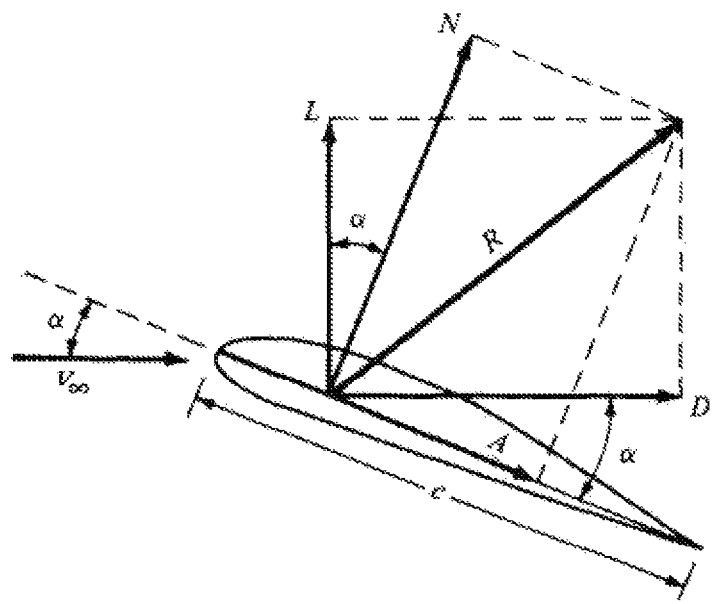
FIG. 5 is a diagram of an aerodynamic force of an airfoil.

| | Airfoils | |
| --- | --- | --- |
| | DU91-W2-250 | NACA64-418 |
| Chord length c (m) | 1.65 | 1.15 |
| Angle of attack range $\alpha$(°) | [−4, 14] | [−4, 14] |
| Thickness of composite membrane (mm) | 0.26 | 0.26 | the PTFE-based nano functional composite membrane with a maximum thickness of 0.26 mm and a surface roughness of 0.18 μm was selected, and the shapes of the blade airfoil before and after being pasted and covered with the PTFE-based nano functional composite membrane had relatively small change, as shown in FIG. 4;

a two-dimension incompressible Navier-Stokes equation was solved by using a finite volume method, wherein the computation state was a steady state, turbulence simulation adopted an SST k-ω model, the computation grid of the airfoil adopted a C-shaped structure grid, 400 grid points were present around the airfoil, the height of the first-layer grid of the blade surface was 9.0×10−6 m and satisfied y+≈1 (the first layer was a bottom layer, and y+ represented a thickness, and 1 represented a precision), and the total number of the grids was 300 thousand. A computation domain for numerical simulation is as shown in FIG. 2, and details of the nearby grids of the two airfoils are as shown in FIG. 3;

geometric modeling was performed, and the boundary of the airfoil was spread along a normal direction by 0.26 mm to obtain a new computational geometry;

the aerodynamic force of the airfoil is as shown in FIG. 5, and influence number simulation computation was performed, wherein the action point of a moment was selected at the position of ¼ chord length of the airfoil, so that the rise moment of the airfoil was positive, and the bow moment of the airfoil was negative, an airfoil lift coefficient was $$C_L = \frac{L}{\frac{1}{2}\rho V_\infty^2 c};$$

a drag coefficient was $$C_D = \frac{D}{\frac{1}{2}\rho V_\infty^2 c};$$

a pitching moment coefficient was $$C_M = \frac{M}{\frac{1}{2}\rho V_\infty^2 c^2};$$

and the changes in aerodynamic coefficients of two wind turbine generator blade airfoils before and after being pasted and covered with the PTFE-based nano functional composite membrane were comparatively analyzed to obtain influence number simulation computation results.

Figure 6:
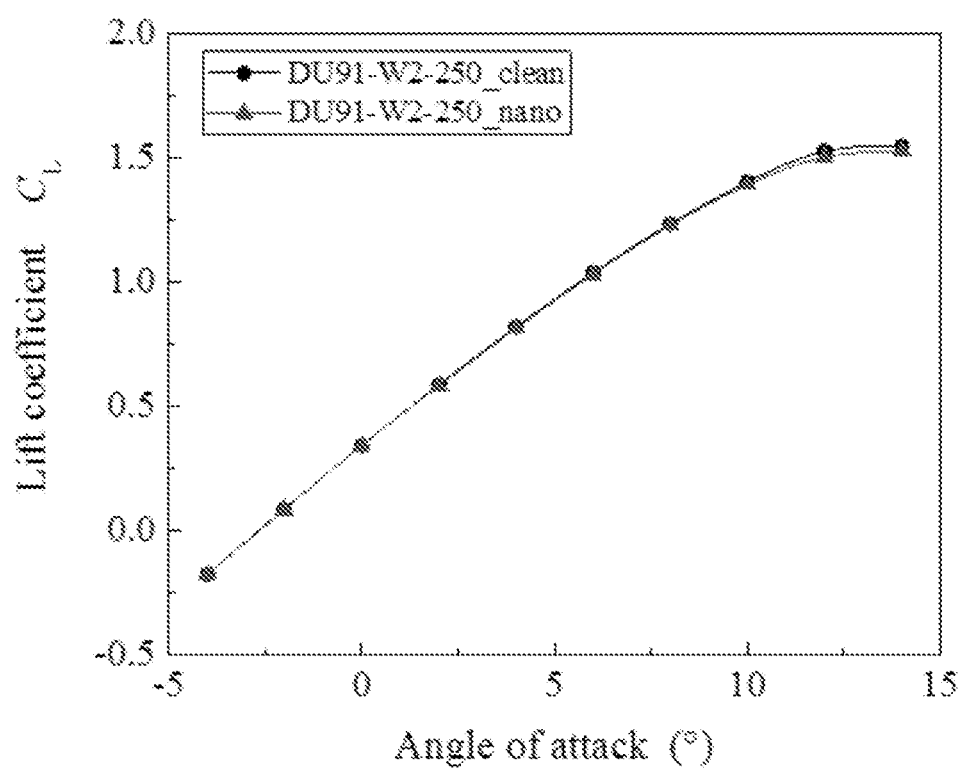
FIG. 6 is a diagram showing influence of a PTFE-based nano functional composite membrane on a lift coefficient of a DU91-W2-250 airfoil.
Figure 7:
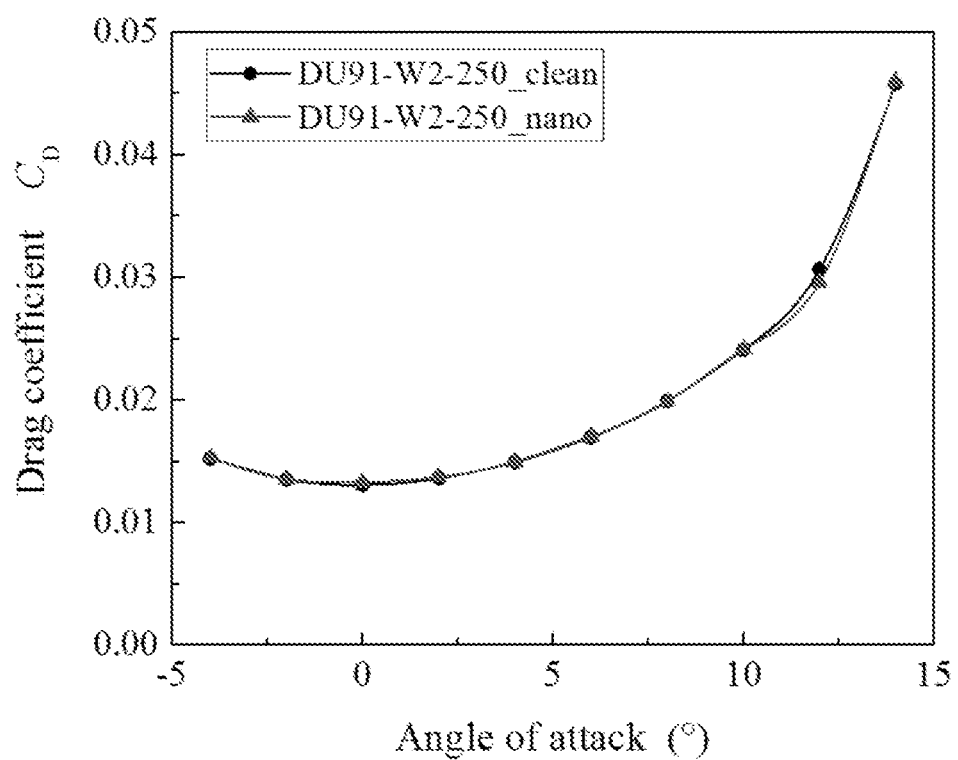
FIG. 7 is a diagram showing influence of a PTFE-based nano functional composite membrane on a drag coefficient of a DU91-W2-250 airfoil.
Figure 8:
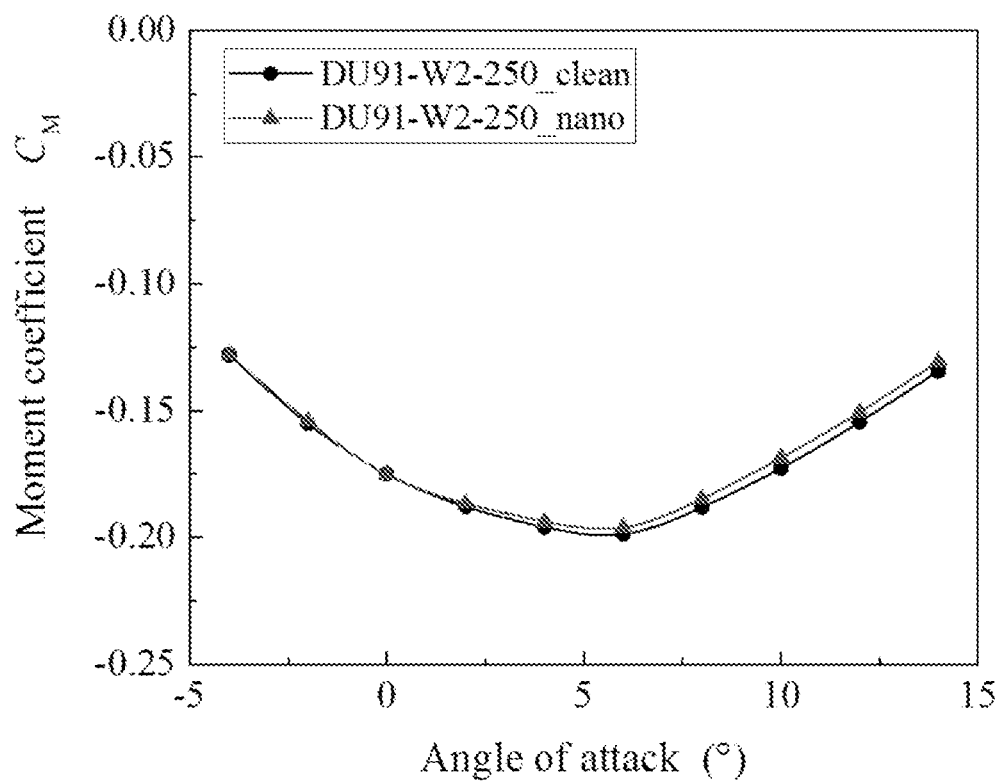
FIG. 8 is a diagram showing influence of a PTFE-based nano functional composite membrane on a moment coefficient of a DU91-W2-250 airfoil.

Comparison of changes in the aerodynamic coefficients of the DU91-W2-250 airfoil before and after being pasted and covered with the PTFE-based nano functional composite membrane is as shown in FIGS. 6-8. The specific result of the aerodynamic coefficient in a non-linear area is as shown in Table 2 from which it can be seen that the PTFE-based nano functional composite membrane has relatively small influences on the aerodynamic parameter of the wind turbine generator DU91-W2-250 airfoil:

1) the curves of the lift coefficients, the drag coefficients and the moment coefficients of the airfoil before and after being pasted and covered with the PTFE-based nano functional composite membrane are almost completely coincident in a linear area, namely, an angle of incidence range [−4°, 8° ], and have slight difference only in a non-linear area (namely, an angle of attack of more than 8°);

2) in the non-linear area, the curve of the lift coefficient of the airfoil after being pasted and covered with the PTFE-based nano functional composite membrane is slightly declined compared with that of the airfoil that is not pasted and covered with the PTFE-based nano functional composite membrane, the lift coefficient CL is maximally reduced by 1.611%, and the moment coefficient CM is maximally reduced by 1.514%;

3) the curves of the drag coefficient and the moment coefficient of the airfoil after being pasted and covered with the PTFE-based nano functional composite membrane are slightly increased compared with the curve of the original clean airfoil, the drag coefficient is maximally increased by 0.45%, and the bow pitch moment coefficient is maximally reduced by 2.9077%;

TABLE 2

Comparison of aerodynamic coefficients of DU91-W2-250 airfoil before and after being pasted and covered with PTFE-based nano functional composite membrane

| AOA | $C_L$_clean | $C_L$_nano | $\Delta C_L/|C_L$_clean$|$ (%) |
|---|---|---|---|
| 10 | 1.40187 | 1.39073 | −0.795 |
| 12 | 1.52475 | 1.50019 | −1.611 |
| 14 | 1.54629 | 1.52668 | −1.268 |

| AOA | $C_D$_clean | $C_D$_nano | $\Delta C_D/|C_D$_clean$|$ (%) |
|---|---|---|---|
| 10 | 0.0240694 | 0.0241057 | 0.1508139 |
| 12 | 0.0306086 | 0.0306961 | 0.2858674 |
| 14 | 0.0457753 | 0.0459817 | 0.4508982 |

| AOA | $C_M$_clean | $C_M$_nano | $\Delta C_M/|C_M$_clean$|$ (%) |
|---|---|---|---|
| 6 | −0.19875 | −0.19613 | 1.3188 |
| 8 | −0.18819 | −0.18471 | 1.8474 |
| 10 | −0.17276 | −0.16864 | 2.3854 |
| 12 | −0.15445 | −0.15054 | 2.5312 |
| 14 | −0.13445 | −0.13054 | 2.9077 |

Figure 9:
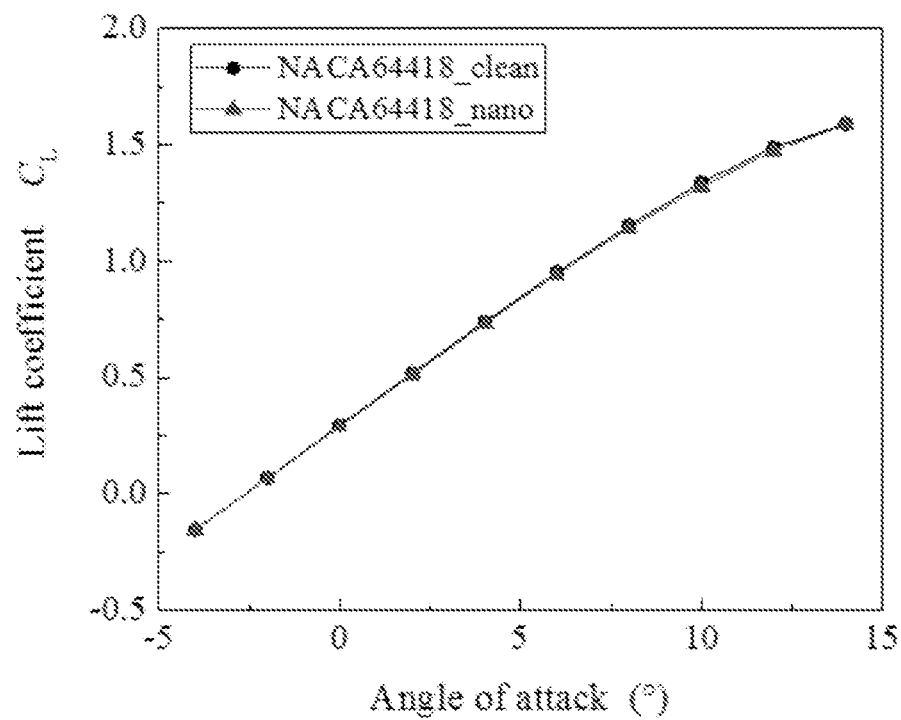
FIG. 9 is a diagram showing influence of a PTFE-based nano functional composite membrane on a lift coefficient of an NACA64-418 airfoil.
Figure 10:
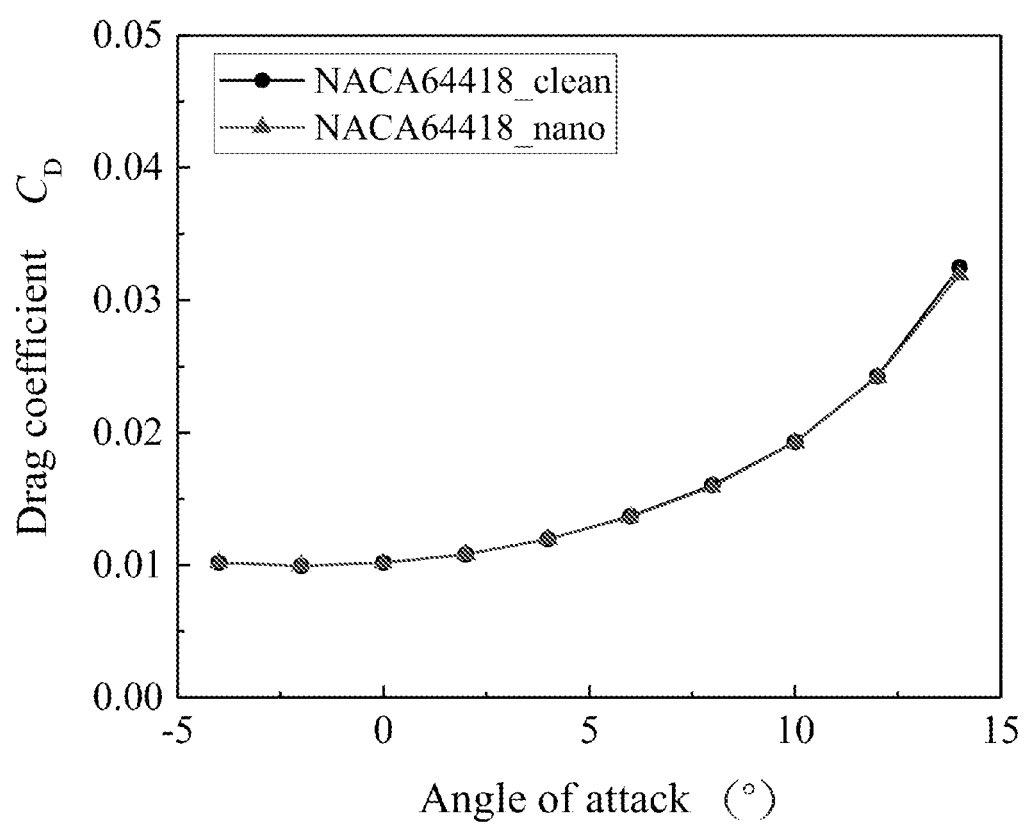
FIG. 10 is a diagram showing influence of a PTFE-based nano functional composite membrane on a lift coefficient of an NACA64-418 airfoil.
Figure 11:
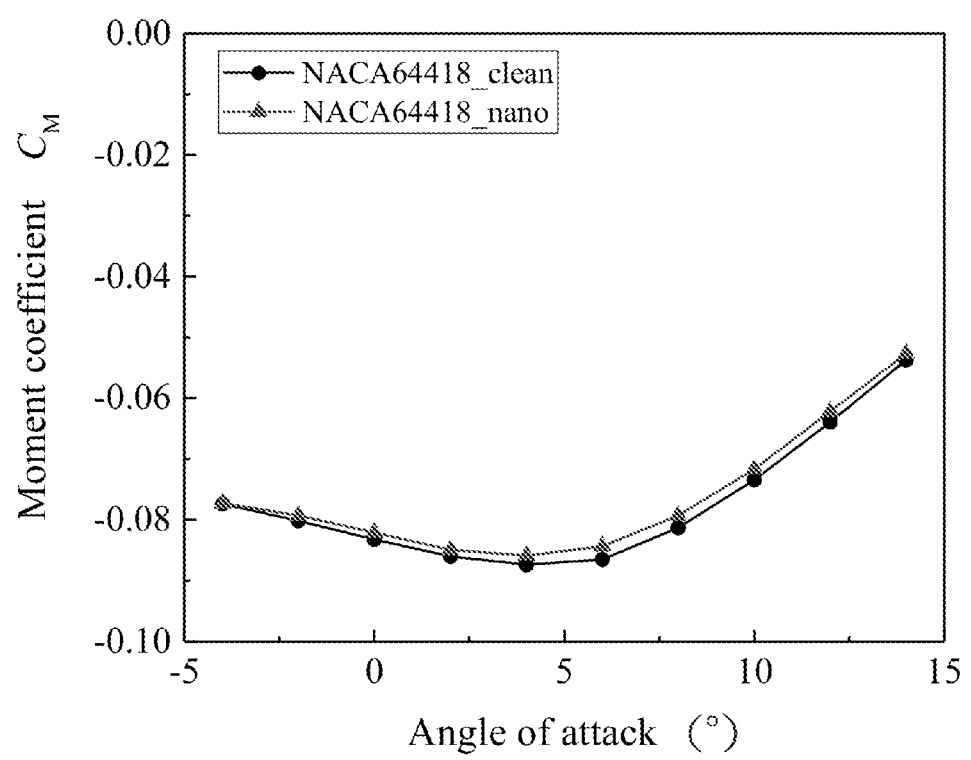
FIG. 11 is a diagram showing influence of a PTFE-based nano functional composite membrane on a lift coefficient of an NACA64-418 airfoil.

Comparison of changes in aerodynamic coefficients of an NACA64418 airfoil before and after being pasted and covered with the PTFE-based nano functional composite membrane is as shown in FIGS. 9-11. The specific results of aerodynamic coefficients in the non-linear area are seen in Table 3 from which it can be seen that:

1) the influence of the PTFE-based nano functional composite membrane on aerodynamic parameters of a wind turbine generator NACA64418 airfoil is similar to that of the DU91-W2-250 airfoil, and the curves of the lift coefficients and the drag coefficients of the airfoil before and after being pasted and covered with the PTFE-based nano functional composite membrane in the linear area are almost completely coincident;

2) in the non-linear area, the curves of the lift coefficient, the drag coefficient and the moment coefficient of the airfoil after being pasted and covered with the PTFE-based nano functional composite membrane are slightly declined compared with those of the airfoil that is not pasted and covered with the PTFE-based nano functional composite membrane, the moment coefficient is slight increased compared with that of the blade that is not pasted and covered with the PTFE-based nano functional composite membrane, the lift coefficient CL is maximally reduced by 1.247%, the drag coefficient CD is maximally reduced by 1.712%, and the bow pitch moment coefficient is maximally reduced by 2.794%.

TABLE 3

Result comparison of aerodynamic coefficients of NACA64418 airfoil

| AOA | $C_L$_clean | $C_L$_nano | $\Delta C_L/|C_L$_clean$|$ (%) |
|---|---|---|---|
| 10 | 1.33883 | 1.32214 | −1.247 |
| 12 | 1.48986 | 1.47472 | −1.016 |
| 14 | 1.59062 | 1.58741 | −0.202 |

| AOA | $C_D$_clean | $C_D$_nano | $\Delta C_D/|C_D$_clean$|$ (%) |
|---|---|---|---|
| 10 | 0.019309 | 0.01928 | −0.153 |
| 12 | 0.024262 | 0.024158 | −0.427 |
| 14 | 0.032488 | 0.031932 | −1.712 |

| AOA | $C_M$_clean | $C_M$_nano | $\Delta C_M/|C_M$_clean$|$ (%) |
|---|---|---|---|
| 4 | −0.087402 | −0.085925 | 1.689 |
| 6 | −0.086507 | −0.084388 | 2.449 |
| 8 | −0.08135 | −0.079346 | 2.463 |
| 10 | −0.073433 | −0.071627 | 2.459 |
| 12 | −0.063955 | −0.062168 | 2.794 |
| 14 | −0.053754 | −0.052683 | 1.992 |

To sum, the changes in aerodynamic characteristics of the two typical wind turbine generator blade airfoils DU91-W2-250 and NACA64418 before and after being pasted and covered with the PTFE-based nano functional composite membrane are as follows: in the linear change area, the lift, drag and moment coefficients of the airfoil are basically not affected by the PTFE-based nano functional composite membrane; in the non-linear change area, each aerodynamic parameter is slightly affected by the PTFE-based nano functional composite membrane so as to lead to reduction in lift coefficient and moment coefficient, and the change percentage of each aerodynamic coefficient is 1.9% or less with little influence. The surface roughness of the PTFE-based nano functional composite membrane is 0.18 um. The surface roughness of the concave-convex geometric ultrastructural morphology with multiple nano and micron sizes is still much lower than the surface roughness 0.70-0.75 of the conventional blade surface coating, and the surface microstructure has better lubricity compared with that of the conventional blade surface coating, thus if from the point of view of surface roughness, the PTFE-based nano functional composite membrane can play a role in improving the aerodynamic characteristics of the airfoil and the entire aerodynamic performance of the blade after pasting and covering the wind turbine blade.

The PTFE-based nano functional composite membrane is a polymer membrane material which is capable of improving the aerodynamic characteristics and the entire aerodynamic performance of the blade airfoil, increasing the utilization efficiency of wind energy to allow the blade to operate under the optimal state, increasing the whole strength of the blade surface to play a role in entire fixation, improving the entire loading capability and foreign object erosion resisting capability of the blade, and eliminating the potential safety hazards such as aging and cracking existing in the blade after pasting and covering the surface of the wind turbine blade. According to the disclosure, the number simulation computation of the influences of the PTFE-based membrane on aerodynamic characteristics and aerodynamic performance of the wind turbine blade airfoil can provide a scientific computation basis for wind power industry applying new technologies and new materials to achieve the efficient utilization of the wind energy resource, and promote the popularization of new technologies and new materials and the improvement of quality and efficiency in wind power industry.

Except for the above embodiments, other embodiments are also included in the disclosure. All of the technical solutions formed by using equivalent replacements or equivalent transformations shall fall within the protective scope claimed by the disclosure.

The invention claimed is:

1. A numerical simulation method of an influence of a polytetrafluoroethylene (PTFE)-based membrane on an aerodynamic characteristic of a wind turbine blade, wherein numerical simulation computation is performed on influences of a PTFE-based nano functional composite membrane on aerodynamic characteristics and entire aerodynamic performance of a blade airfoil after pasting and covering the surfaces of blades of a large horizontal axis wind turbine by using a hydrodynamic computation method, which comprises the following steps:

(1) selecting two blade airfoils;

(2) determining that wind energy capture areas of a blade are located in middle and tip areas of the blade, selecting chord length positions and angle of attack ranges of the two airfoils according to respective spreading position and chord length distribution direction, and meanwhile selecting Reynolds numbers for aerodynamic characteristic computation of the airfoils;

(3) selecting a PTFE-based nano functional composite membrane with a maximum thickness of 0.26 mm and a surface roughness of 0.18 μm;

(4) solving a two-dimension incompressible Navier-Stokes equation by using a finite volume method, wherein the computation state is a steady state, turbulence simulation adopts an SST k-ω model, the computation grid of the airfoil adopts a C-shaped structure grid, and the height of the first-layer grid of the surface of the blade satisfies y+≈1 (the first layer is a bottom layer, and y+ represents a thickness, and 1 represents a precision);

(5) geometrically modeling, and spreading the boundary of the airfoil along a normal direction by the same distance as a membrane thickness to obtain a new computational geometry;

(6) performing influence number simulation computation, wherein the action point of a moment is selected at the position of ¼ chord length of the airfoil, so that the rise moment of the airfoil is positive, and the bow moment of the airfoil is negative, an airfoil lift coefficient is $$C_L = \frac{L}{\frac{1}{2}\rho V_\infty^2 c};$$

a drag coefficient is $$C_D = \frac{D}{\frac{1}{2}\rho V_\infty^2 c};$$

a pitching moment coefficient is $$C_M = \frac{M}{\frac{1}{2}\rho V_\infty^2 c^2};$$

and
(7) comparatively analyzing changes in aerodynamic coefficients of two wind turbine generator blade airfoils before and after being pasted and covered with the PTFE-based nano functional composite membrane to obtain influence number simulation computation results.

2. The numerical simulation method of the influence of the PTFE-based membrane on an aerodynamic characteristic of a wind turbine blade according to claim 1, comprising the following steps:
(1) selecting four wind turbine generators with different capacities and models, including a China Southern Airlines NH1500 wind turbine, an American NRE5000 offshore wind turbine, a Goldwind GW103-2500 wind turbine and a Guodian United Power UP2000-96 wind turbine, and finally selecting two basic blade airfoils by integrating design data of four wind turbine generator blades, namely, DU91-W2-250 and NACA64-418;
(2) determining that the wind energy capture areas of the blade are located in the middle and tip areas of the blade, selecting chord length positions and angle of attack ranges of the two airfoils according to respective spreading position and chord length distribution direction, wherein the chord length positions are selected by referring to 60% R and 85% R positions of blades of a UP2000-96 wind turbine, R represents the chord length of each sectional airfoil of the blade in a radial direction, respectively being 1.65 m and 1.15 m; the angle of attack ranges are both [−4, 14], and meanwhile the Reynolds number for aerodynamic characteristic computation is selected as $3.0 \times 10^6$;
(3) selecting the PTFE-based nano functional composite membrane with a maximum thickness of 0.26 mm and a surface roughness of 0.18 μm;
(4) solving a two-dimension incompressible Navier-Stokes equation by using a finite volume method, wherein the computation state is a steady state, turbulence simulation adopts an SST k-ω model, the computation grid of the airfoil adopts a C-shaped structure grid, 400 grid points are present around the airfoil, the height of the first-layer grid of the blade surface is $9.0 \times 10^{-6}$ m and satisfies y+≈1, and the total number of the grids is 300 thousand;
(5) geometrically modeling, and spreading the boundary of the airfoil along a normal direction by 0.26 mm to obtain a new computational geometry;
(6) performing influence number simulation computation, wherein the action point of a moment is selected at the position of ¼ chord length of the airfoil, so that the rise moment of the airfoil is positive, and the bow moment of the airfoil is negative,
an airfoil lift coefficient is $$C_L = \frac{L}{\frac{1}{2}\rho V_\infty^2 c};$$

a drag coefficient $$C_D = \frac{D}{\frac{1}{2}\rho V_\infty^2 c};$$

a pitching moment coefficient is $$C_M = \frac{M}{\frac{1}{2}\rho V_\infty^2 c^2};$$

and
(7) comparatively analyzing changes in aerodynamic coefficients of two wind turbine generator blade airfoils before and after being pasted and covered with the PTFE-based nano functional composite membrane to obtain influence number simulation computation results:
in the linear change area, the lift, drag and moment coefficients of the airfoil are basically not affected by the PTFE-based nano functional composite membrane; in the non-linear change area, each aerodynamic parameter is slightly affected by the PTFE-based nano functional composite membrane so as to lead to reduction in the lift coefficient and the moment coefficient, and the change percentage of each aerodynamic coefficient is 1.9% or less with little influence;
from the point of view of surface roughness, the PTFE-based nano functional composite membrane can play a role in improving the aerodynamic characteristics of the airfoil and the entire aerodynamic performance of the blade after pasting and covering the blade of the wind turbine.

* * * * *